United States Patent [19]

Frid

[11] Patent Number: 4,472,626
[45] Date of Patent: Sep. 18, 1984

[54] INFORMATION AND PROTECTION SYSTEM FOR CHECKS AND CREDIT CARDS

[76] Inventor: Salomon R. Frid, Chilpancingo 14-502, Mexico, 11, D. F., Mexico

[21] Appl. No.: 339,000

[22] Filed: Jan. 12, 1982

[30] Foreign Application Priority Data

Jan. 16, 1981 [MX] Mexico ................................. 185607

[51] Int. Cl.³ ............................................. G06F 15/30
[52] U.S. Cl. .................................... 235/379; 235/380
[58] Field of Search ............................... 235/379, 380; 340/825.34

[56] References Cited

U.S. PATENT DOCUMENTS

| | | | |
|---|---|---|---|
| 4,023,013 | 5/1977 | Linher | 235/379 |
| 4,048,618 | 9/1977 | Hendry | 340/825.34 |
| 4,109,238 | 8/1978 | Creekmore | 235/379 |
| 4,249,163 | 2/1981 | Mauker | 235/379 |
| 4,315,101 | 2/1982 | Atalla | 235/379 |

OTHER PUBLICATIONS

*Primary Examiner*—Harold I. Pitts
*Attorney, Agent, or Firm*—Lowe, King, Price & Becker

[57] ABSTRACT

A verification system for checks and credit cards is operable for accepting a credit card and transaction receipt, or for accepting a check and an identification card, for transmitting data to a remote verification system and for receiving acceptance or rejection instructions for the transactions based on verification of credit funds availability, and for recording symbols on the transaction receipt or the check.

15 Claims, 7 Drawing Figures

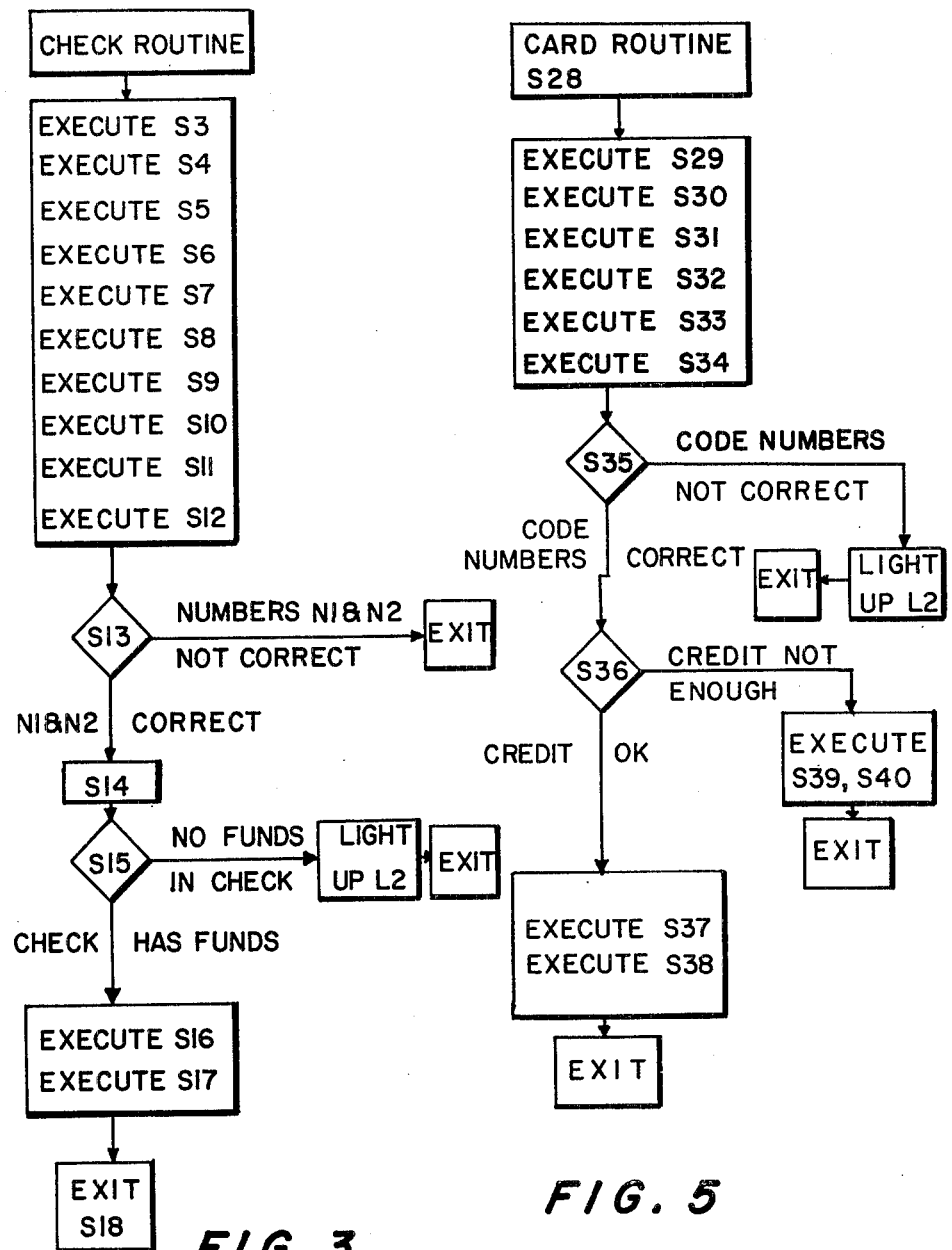

INFORMATION AND PROTECTION SYSTEM FOR CHECKS AND CREDIT CARDS

BACKGROUND OF THE INVENTION

Technical Field

This invention relates to systems for verification of information pertaining to financial instruments and credit transactions, and more specifically to systems using telephonic communications to obtain verification information pertaining to the status of a checking account or a credit account from a central office.

In the prior art there are known various systems of obtaining information concerning checks and/or credit cards, as well as systems of protection of such checking or credit accounts. However, such systems are typically available only for the use of a banking intercommunication network, access thereto being denied to persons and establishments not affiliated therewith.

Such prior art systems utilize direct telephonic connections between electronic computers and system terminals, and provide the desired information directly on screen displays.

There is thus a need in the prior art for systems which can store, transmit, receive and decode information about a check or a credit card for application to specific transactions and for directly imprinting on transaction documents information pertinent to approval of the transaction.

SUMMARY AND OBJECTS OF THE INVENTION

It is accordingly a primary object of the present invention to overcome the deficiencies of the prior art and to provide an improved system for credit verification and approval of checking transactions.

It is a more specific object of the invention to provide a system for storing, transmitting, receiving and decoding information concerning a check or a credit card.

Yet another object of the invention is the provision of a system for transmitting information concerning a specific transaction to a computer storing data pertinent to a check or credit card used in the transaction.

It is an additional object of the invention to provide a system for imprinting transaction records with indicia representing the presence of sufficient credit in a credit account or of sufficient funds in a check account used for the transaction.

It is still a further object of the invention to provide a system incorporating structure for verifying the identity of the user along with verification of credit or fund availability in a transaction.

It is another object of the invention to provide an apparatus for verifying the validity of a credit card used during a transaction.

Still another object of the invention is the provision of a method and apparatus for verification of credit, of funds availability, of user identity, and of status of a credit card or checking account used in a commercial transaction.

In accordance with the foregoing objects of the invention, there is provided an apparatus for communicating with a remote computer for credit and checking account verification.

The inventive structure incorporates a console and a control system therefore including structural components capable of accepting transaction documents and identification cards, a communication system, and a method for operation of the same.

The foregoing and other objects, features and advantages of the present invention will become more readily apparent to those skilled in the art from the following description wherein there is shown a preferred embodiment of the best mode for carrying out the invention, simply by way of illustration and not of limitation thereof.

BRIEF DESCRIPTION OF THE DRAWINGS

The preferred embodiment of the invention will be understood from the following description when taken in conjunction with the accompanying drawings, wherein:

FIGS. 3 and 4 provide flow charts descriptive of one mode of operation of the inventive system; and FIGS. 5 and 6 provide flow charts descriptive of another mode of operation of the inventive system.

DETAILED DESCRIPTION OF THE PREFERRED EMBODIMENT

Figure 1:
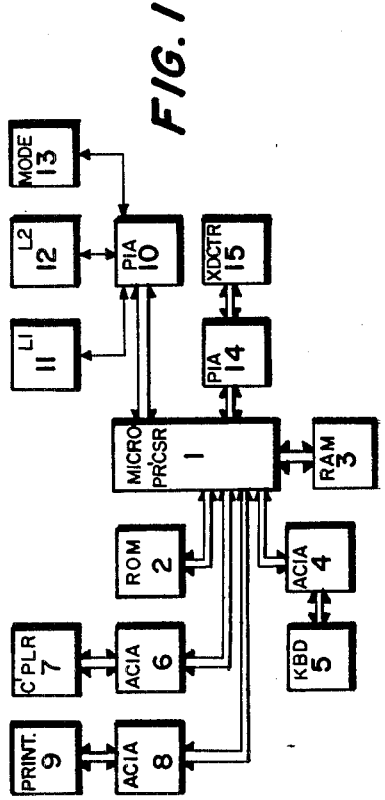
FIG. 1A shows a console used in the present invention.
FIG. 1B shows a block diagram illustrating the structure of the inventive system.
Figure 1A:
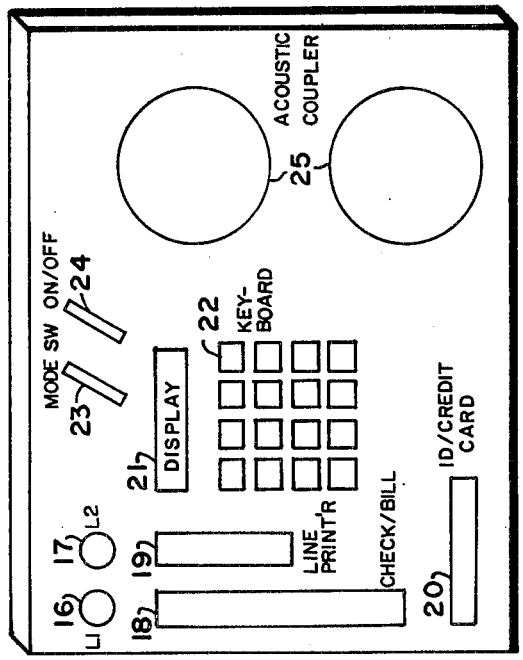

Referring now to FIG. 1A, there is generally shown at 100 a console used in the inventive apparatus.

As seen in the figure, console 100 incorporates two slots, 18 and 20, for insertion of a transactional document, such as a check or credit bill to be signed in a credit transaction, and for insertion of an identification card, credit card or the like, respectively.

Also shown on the console 100 is a sixteen button keyboard 22 and a display 21. Keyboard 22 incorporates various keys thereon for input of information to a computer included in the system. Thus, keys representing the numbers 0–9, a period, "delete", "return" and "reset" functions are provided on the keyboard. Of course, other keys may similarly be provided on the keyboard.

A line printer 19 is also provided on the inventive console, for writing onto the document placed in slot 18. Since transactional documents are typically made of paper, the printer 19 may be of a type for printing on paper, utilizing mechanical or thermal imprinting apparatus. Of course, any other type of printer will be similarly applicable for the present invention.

Also shown on the console are a pair of switches 23 and 24. Switch 23 is used as a mode switch, to indicate to the system the mode in which the apparatus is functioning. Specifically, switch 23 is used to indicate whether the apparatus is functioning in a check verification or in a credit verification mode. Additionally, switch 24 is provided as an on-off switch, for turning the inventive apparatus on and off.

A pair of indicators 16 and 17 is shown on the console for indicating a result of the inquiry. Preferably, indicators 16 and 17 are light indicators. The first light indicator 16 is caused to illuminate to indicate that the check (or credit card) being verified (depending on the mode of operation) is good, or valid. The second light, 17, is caused to illuminate if the response to the check (or credit card) inquiry is negative, i.e., if the check (or credit card) is not good or valid.

Console 100 further includes thereon an acoustic coupler 25, for communication with a remote computer or other verification system.

It is contemplated for the present invention that persons opening checking accounts at a bank will receive special identification cards, for use in slot 20 as previously described. Such an identification card includes a storage device thereon for storing of a particular number assigned by the bank. The assigned number is also recorded in the bank computer, together with the regular checking account number. Preferably, the storage device on the special identification card is a piece of magnetic tape.

The identification card may also, optionally, include a picture of the person authorized to draw checks upon the account, as well as the person's signature. Thus, a visual check may be made to certify that the person signing the check is, indeed, the authorized person. Additonally, the check signature may be verified to be the authorized signature by comparison with the signature on the card. Further, the identification card may include a telephone number thereon.

Referring now to FIG. 1B, the system is shown in block diagram form as including an interconnection of a number of separate elements.

The internal elements of the system illustrated by console 100 include a microprocessor 1, which may, for example, be a Motorola 6800 microprocessor. A ROM (Read Only Memory) chip 2 is connected to the microprocessor. ROM 2 preferably contains the program to be executed by microprocessor 1. One commercially available device which may be used as ROM 2 is a Motorola chip designated by the reference 6830.

The inventive system further includes a RAM (Random Access Memory) chip 3, which may be of the type Mbtorola 6810, also connected to microprocessor 1.

As further shown in FIG. 1B, there are provided three ACIA's (Asynchronous Communications Interface Adapters), which may, for example, be of the type Motorola 6850. Each of the three ACIA units is connected to the microprocessor 1. A first ACIA 4 is connected to keyboard 22. However, since keyboard 22 merely shows the physical arrangement of the keys, the electrical representation of the keyboard utilizes a different reference numeral therefor, specifically the numeral 5.

A second ACIA, designated by reference numeral 6, is connected to acoustic coupler 25, represented in the electrical block diagram by the numeral 7. The third ACIA, shown as the block labelled 8, is connected to line printer 19, shown at reference numeral 9.

In addition to the foregoing elements of the inventive system, there are provided two PIA's (Peripheral Interface Adapters), shown at reference numerals 10 and 14. Both PIA units are connected to microprocessor 1.

A first PIA, shown as unit 10, is connected to the three elements 11, 12 and 13 representing, respectively, light indicators 16 and 17, and mode switch 23. The second PIA, 14, is connected to a transducer 15, placed at the ID or credit card slot 20, for detecting the data stored on the card.

Operation of the inventive apparatus, from the user's point of view, is described as follows.

Check Verification

For check verification, a check is drafted and signed, in the same manner as is normally done.

Mode switch 23 is placed in the "check" mode, and the special purpose identification card obtained from the account holder for insertion into slot 20. At this time, a visual inspection of the photograph on the card may be made to determine that the person signing the check is, indeed, the person authorized to do so as indicated by the photograph. Simultaneously, the signature on the card may be inspected to determine correspondence with the signature on the check.

Clearly, if either of the photograph or the signature on the card do not match the individual or his/her signature, the system subscriber will not accept the check.

The identification card is then inserted in slot 20 and switch 24 is used to turn the apparatus on.

Keyboard 22 may be used to enter the check number and the check account number, as well as the amount of the check.

At this point the check is inserted in the check slot 18, and the telephone number written on the special identification card is dialed. Any telephone may be used for dialing the number, and a special line or instrument is not required. After having dialed the number, the user places the handset of the telephone instrument in the acoustic coupler 25 provided therefore.

After an appropriate wait for the remote computer to determine whether or not the check is good (i.e., that sufficient funds are extant in the account), a number will be written on the check and light 16 will be illuminated. However, if the check is determined to be invalid, then light 17 will be illuminated.

A similar procedure is used to verify a credit card used for a transaction.

Initially, the mode switch 23 is put to the "credit" position, to place the device in the "credit card" mode. The purchaser's credit card is inserted in slot 20 therefor, and the apparatus turned on.

Keyboard 22 is used to enter the amount being signed for, and the credit card bill is inserted in slot 18. Similarly to the previously described check cashing procedure, the telephone number on the credit card is dialed.

After a wait during which the remote computer determines the validity of the credit card, a number will be printed on the bill and light 16 will be illuminated, to indicate that the credit card is valid and that the amount entered via the keyboard is within the card holder's authorization.

However, if the credit card is invalid, then light 17 will be illuminated, indicating that the requested credit should be refused.

The following sections of the specification relate to an explanation of the flow charts of FIGS. 2–6, describing the internal functioning of the present apparatus.

Figure 2:
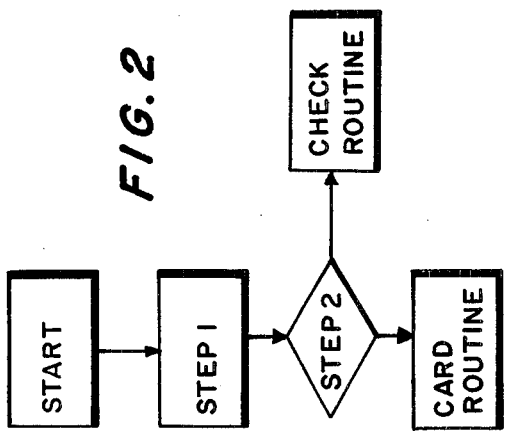
FIG. 2 is a flow chart representing in broad terms the operation of the invention.

Referring now specifically to FIG. 2, the initialization of system operaton is generally described by the block labelled "START", which causes the microprocessor within the system to execute "STEP 1".

At step 1 the computer reads the setting of mode switch 13 via a bit in PIA 10 storing that setting. At "STEP 2" the microprocessor checks the status of that bit. Illustratively, if the bit is 0 then the 'CHECK ROUTINE' is executed, while otherwise the 'CARD ROUTINE' is executed.

Execution of the check routine is illustrated by the flow chart of FIG. 3, wherein at step S3 the check number is read from the keyboard 22 and stored in RAM 3. At step S4 the microprocessor reads the account number from keyboard 22 and stores the same in RAM 3. At step S5, the amount of the check is similarly entered at keyboard 22 and stored in RAM 3, while at step S6 PIA 14 is interrogated by the microprocessor to read in the card number of the identification card in the card slot. At step S7 two special code numbers C1 and C2 are stores in the RAM, while at step S8 the console computer waits until the remote receiving computer indicates its readiness to receive. The waiting mode is achieved at step S9 by checking a specific bit in ACIA 6, which bit identifies the status of the remote computer. In step S10, the local computer determines the readiness of the remote computer when the special bit is detected to be equal to 1. At this time, step S11 is executed.

In step S11 the microprocessor sends all the information which has thus far been stored in RAM 3 to the remote computer, which, in turn, analyzes and stores the data, as described below with respect to FIG. 4.

At step S12 the local computer waits for return information from the remote receiving computer. The information received from the remote computer includes:

(1) two code numbers may be transmitted by the remote computer and denoted as N1 and N2 (these numbers need not be the same as C1 and C2);
(2) a special code, N3, indicating whether the checking account has sufficient funds; and
(3) a special identification number, N4, to be printed on the check, received if the checking account has sufficient funds.

Code numbers N1 and N2 are provided to those institutions which want to use the present system, as will be the special code N3.

The received information is stored in RAM 3 for analysis at step S13.

In step S13, N1 and N2 are analyzed for correctness. If these numbers correspond to the numbers provided to the subscribing institution they are deemed to be correct and the computer proceeds to analyze N3. If the numbers are incorrect, a signal is sent to PIA 10 for illuminating light 12, indicating the check is not to be accepted. The procedure then exits from the routine.

At step S14 the computer begins analysis of code number N3. At step S15 the significance of code N3 is determined. If N3 is determined to represent sufficient funds in the checking account, then at step S16 a signal is sent to PIA 10 to illuminate light 11, indicating the presence of sufficient funds in the checking account.

Thereafter, at step S17 a signal is sent to ACIA 8 to cause line printer 9 to print the code number N4 on the check.

At this point, the check verification routine is complete, and the routine exits at step S18.

Figure 4:
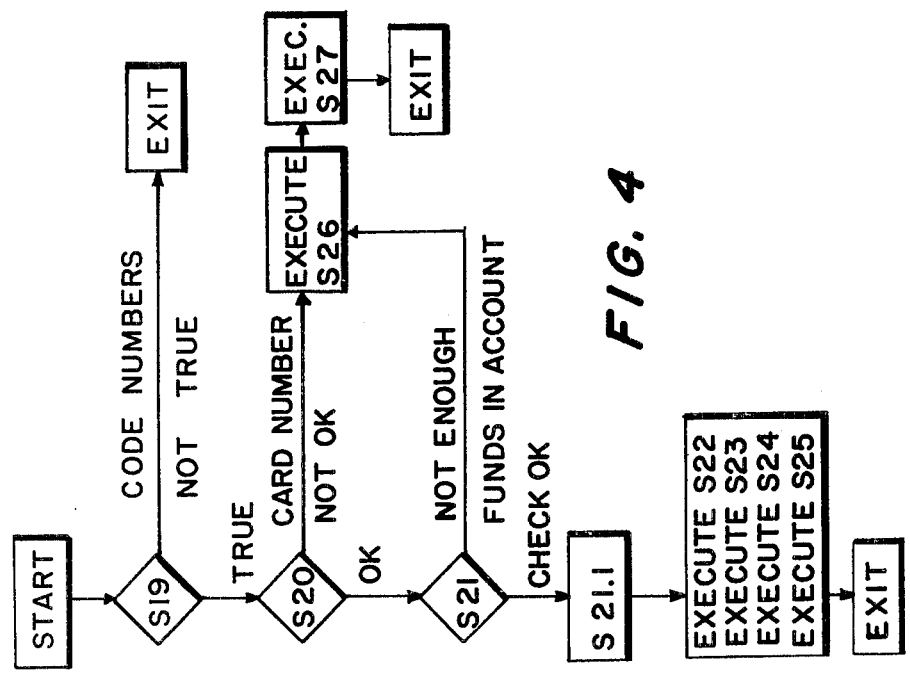

Referring now to FIG. 4, there is shown the method of operation for the remote receiving computer at steps labelled S19 to S27.

When the remote computer receives the information transmitted by the local console at its step S11, the two code numbers are verified at step S19. If the code numbers are erroneous, the procedure is terminated and exited. If the received numbers are correct, then step S20 is executed, wherein the received account number is checked to determine whether the transmitted card number corresponds to the account number. If the number does not correspond to the number associated with the account number, the procedure executes steps S26 and S27, described infra, and exits. If the card number corresponds to the account number, however, then step S21 is executed, wherein the sufficiency of funds in the account is determined. As a result of step S21, if it is determined that there are not sufficient funds in the account to pay the check, step S26 is executed.

In step S26 the numbers N1 and N2 are transmitted to the local console computer. Then the code indicating insufficient funds is similarly transmitted. Thereafter, the procedure is ended at step S27.

If the result of the determination at step S21 is positive, however, that is, if sufficient funds are found in the account, then the remaining steps (S22 through S25) are executed. An optional step, S21.1, may be executed first, however. In the optional step, the bank providing the service may implement a policy of reducing the balance of the account by the amount of the check.

Whether or note the optional step is performed, however, at step S22 the receiving computer generates a random number R1. At step S23 the procedure stores the check number and amount, as well as R1, in the list of the protected checks of the account.

At step S24 the numbers N1 and N2, as well as the code indicating sufficient funds, are transmitted to the local computer. Then, R1 (previously referred to as N4) is transmitted to the local computer for printing on the check.

The procedure is terminated at step S25, and the executing computer exits therefrom at step S27.

CREDIT VERIFICATION

Referring now to the flow chart in FIG. 5, there is shown therein a procedure for verifying a credit card for use in conjunction with the console shown in FIGS. 1A and 1B.

The procedure is selected by the procedure of FIG. 2 if the mode switch is appropriately set therefor. Execution of the card verification procedure begins at step S28, and at step S29 the amount of desired credit is read from the keyboard and stored in RAM 3.

Because of similarity to steps S3–S12, the description of steps S29–S34 will be abbreviated for convenience.

The card number detected at the card slot is read at step S30 from PIA 14. Two special code numbers (M1 and M2) are stored in RAM 3 in step S31, and a ready signal from the receiving computer is awaited. The signal is received at step S32, and the information stored in the RAM is transmitted in step S33 to the remote receiving computer. The information is transmitted through the ACIA connected to the acoustic coupler.

At step 34 the procedure provides a waiting period until the remote computer sends the information back. Similarly to the previously described check verification procedure, the information received from the remote computer includes four numbers.

Two special code numbers T1 and T2 are provided to those institutions wishing to utilize the present service. A special code T3 is provided to indicate whether or not the card is to be accepted. Finally, a number T4, to be printed on the credit card bill, is provided.

Upon receipt of the four numbers, T1 and T2 are checked at step S35. If found to be correct, step S36 is executed. Otherwise, at step 39 a signal is sent to illuminate light 12 to indicate that the credit card is not to be accepted, and the procedure is terminated.

At step S36 the number T3 is checked to determine whether the code represents acceptability of the credit card. If the code represented by T3 indicates that the credit card should not be accepted, then step S39 is executed, light 12 is illuminated, and the procedure terminated. If, on the other hand, the code represented by T3 indicates acceptability of the credit card, then step S37 is executed, light 11 is illuminated, and the number T4 is sent to the line printer for printing on the credit bill. Step 38 then terminates the procedure.

Figure 6:
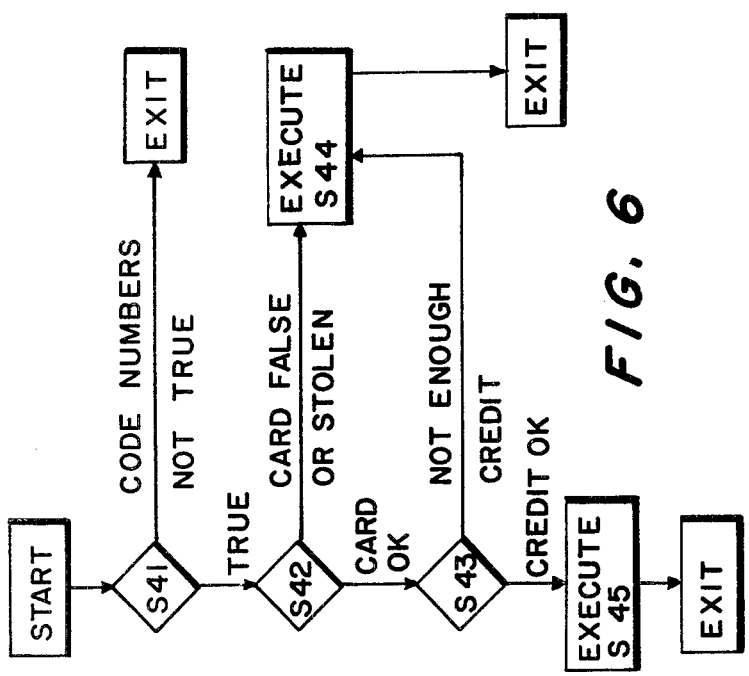

Referring now to FIG. 6, there is displayed a flow diagram illustrating the procedure to be followed at the remote location during a credit card verification. Because of similarities with the procedure illustrated in the flow diagram of FIG. 4 for check verification, the following description is somewhat abbreviated for convenience.

As previously described, the local computer initiates the card routine upon detection of the appropriate status of mode switch 23. The remote computer starts the procedure by determining the veracity of the information transmitted from the local console at step S33.

Thus, at step S41 the remote station determines whether or not the code numbers M1 and M2 are correct. If incorrect, the computer exits at this portion of the procedure.

If the code numbers are determined to be correct, then step S42 is executed. Therein it is determined whether the credit card number is valid. I.e., it is determined if the card is forged, or if the card has been stolen and is being used improperly. If the card number is valid, then step S43 is executed, wherein it is optionally determined whether sufficient credit is available for the card.

If the result of step S43 is negative, or if the result of step S42 is negative (the card is forged or stolen), then step S44 is executed, wherein two special code numbers T1 and T2, as well as the number T3 encoded to indicate that the card should not be accepted, are transmitted to the local console. At that point, the procedure terminates.

However, if the results of step S42 and (if performed) step S43 indicate that the card is valid (and the requested credit is adequate), then step S45 is executed. Upon execution of step S45 the numbers T1 and T2 are transmitted to the local console, as well as the number T3 encoded to indicate that the card should be accepted. Finally, a random number is generated (previously referred to as T4) and transmitted to the requesting local console.

The number T4 and the amount of the credit are stored in the list of credits which have been checked in accordance with this procedure for the particular credit card.

At this point, the procedure terminates.

The foregoing description of a preferred embodiment of the invention is presented for purposes of illustration and description, and is not intended to be exhaustive or to limit the invention to the precise form disclosed, since many modifications and variations are possible in light of the above teaching. The embodiments were chosen and described in order best to explain the principles of the invention and its practical application, thereby to enable others skilled in the art to utilize the invention in various embodiments and with various modifications as are suited to the particular use contemplated. All such modifications and variations are within the scope of the invention as determined by the appended claims and interpreted in accordance with the breadth to which they are fairly, legally and equitably entitled.

Having described the invention we consider it as a novelty and thus we claim as to our property the contained in the following clauses:

1. A verification system for both checks and credit cards used in a commercial transaction comprising:
    (a) document accepting means for receiving a document representing the transaction;
    (b) means for accepting identification means;
    (c) recording means for recordation of symbols representative of the transaction on the document received by the document accepting means;
    (d) transmitting means for transmitting data detected by said means for accepting to a remote station and for transmitting information descriptive of the document and the transaction to the remote station;
    (e) receiving means for receiving information from the remote station;
    (f) display means for displaying information indicative of acceptance or rejection of the transaction by the remote station;
    (g) mode selecting means for selecting a mode of operation for causing said verification system to operate for verification of check payment transactions or credit transactions; and
    (h) controller means for enabling said document accepting means to accept either checks or transaction credit records provided thereto together with an identification or credit card, respectively, provided to said means for accepting, for enabling said transmitting means to transmit information pertinent to both said check and to said identification card or to both said transaction credit record and to said credit card to the remote station, for enabling said receiving means to receive acceptance or rejection information, for enabling said display means to display acceptance or rejection to an operator, and for enabling said recording means to record specific information representative of the transaction on the check or transaction credit record.

2. A verification system as recited in claim 1 further comprising a console housing said document accepting means, said means for accepting, said recording means, said transmitting means and said display means,
    wherein said document accepting means comprises a first slot in said console for accepting said checks or transaction credit records, said means for accepting comprises a second slot in said console for accepting said identification or credit cards, said recording means comprises means adjacent said first slot for recording said symbols on said document, said transmitting means comprises a means for telephonic communication with said remote station, and said display means comprises a pair of lights for displaying acceptance or rejection, respectively, of the transaction,
    said means further including keyboard means for inputting additional information for transmission to said remote station.

3. A verification system for both checks and credit cards used in a commercial transaction comprising:
    (a) document accepting means for receiving a document representing the transaction;
    (b) means for accepting identification means;
    (c) recording means for recordation of symbols representative of the transaction on the document received by the document accepting means;

(d) transmitting means for transmitting data detected by said means for accepting to a remote station and for transmitting information descriptive of the document and the transaction to the remote station;

(e) receiving means for receiving information from the remote station;

(f) display means for displaying information indicative of acceptance or rejection of the transaction by the remote station;

(g) mode selecting means for selecting a mode of operation for causing said verification system to operate for verification of check payment transaction or credit transactions; and (h) controller means for enabling said document accepting means to accept either checks or transaction credit records provided thereto together with an identification or credit card, respectively, provided to said means for accepting, for enabling said transmitting means to transmit information pertinent both to said check and to said identification card or to both said transaction credit record and to said credit card to the remote station, for enabling said receiving means to receive acceptance or rejection information, for enabling said display means to display acceptance or rejection to an operator, and for enabling said recording means to record specific information representative of the transaction on the check or transaction credit record, said controller means comprising microprocessor means, a plurality of interface adapter means for providing communications between said microprocessor means and said transmitting means, said display means, said means for accepting and said recording means, and wherein said mode selecting means comprises switch means for providing to said microprocessor means a signal indicative of a user's choice of operating modes, said microprocessor means being operable for verification of credit in one mode and for verification of availability of funds in a checking account in another mode, said switch means connected to said microprocessor means via one of said interface adapter means.

4. A verification system as recited in claim 3 wherein said microprocessor means is operable for reading said signal from said switch means upon initiation of the verification system and for selecting one of a plurality of operating sequences responsive thereto.

5. A verification system as recited in claim 4 further including a keyboard means for user input of information and wherein said microprocessor means is operable for responding to a first setting of said switch means by:

(a) storing a check number, a checking account number, and a check amount, all input from said keyboard means, in said memory means, and further for storing an identification number read from the identification card in said second slot and for storing said identification number and a pair of identification code numbers in said memory means;

(b) transmitting the data stored in said memory means to said remote station;

(c) receiving information from said remote station for indication of acceptance or rejection of the checking transaction, and for imprinting on the check document.

6. A verification system as recited in claim 5 wherein said microprocessor means is further operable for verifying the information received from the remote station with the pair of identification code numbers stored in said memory means, for activating said display means to indicate a rejected transaction if the stored and received data are different or if the information received from said remote station is indicative of rejection of the checking transaction, and for activating said display means to indicate an accepted transaction if the information received from said remote station is indicative of acceptance of the transaction.

7. A verification system as recited in claim 6 wherein said microprocessor is further operable for awaiting receipt of information indicative, of operability of the remote station prior to transmitting said data from said memory means thereto.

8. A verification system as recited in claim 5 wherein said remote station is operable responsive to receiving information transmitted from said microprocessor for verifying the identification code numbers, verifying the identification number read from said identification card in said second slot as corresponding to a stored number associated with the checking account number, determining whether sufficient funds are on hand in the specific checking account, and for transmitting acceptance data to the console microprocessor.

9. A verification system as recited in claim 8 wherein said remote station is further operable for deducting an amount equal to the amount of the transaction from the checking account when determined to be a valid account.

10. A verification system as recited in claim 8 wherein said remote station is further operable for transmitting identification numbers to the console microprocessor and for transmitting information indicative of insufficient funds in the checking account.

11. A verification system as recited in claim 5 further including a keyboard means for user input of information and wherein said microprocessor means is operable for responding to a second setting of said switch means by:

(a) storing in said memory means an amount of credit desired, as input from said keyboard means, and further for storing in said memory means a credit card number read from the credit card in said second slot and for storing a pair of identification code numbers in said memory means;

(b) transmitting the data stored in said memory means to said remote station;

(c) receiving information from said remote station for confirmation of said pair of identification code numbers, for indication of acceptance or rejection of the credit transaction, and for imprinting on the credit document.

12. A verification system as recited in claim 11 wherein said microprocessor means is further operable for activating said display means to indicate a rejected transaction if the received identification data are invalid or if the information received from said remote station is indicative of rejection of the credit transaction, and for activating said display means to indicate an accepted transaction if the information received from said remote station is indicative of acceptance of the transaction.

13. A verification system as recited in claim 11 wherein said remote station is operable responsive to receiving information transmitted from said microprocessor for verifying the identification code numbers, for verifying validity of said credit card number for determining whether sufficient credit is available, and for transmitting acceptance data to the console microprocesor.

14. A verification system as recited in claim 13 wherein said remote station is further operable for transmitting information indicative of insufficient credit availability thereby to cause said microprocessor to activate said display means to indicate rejection of the credit transaction.

15. A verification system as recited in claim 1 wherein said remote station is operable for storing therein information pertaining to checking and credit accounts.

* * * * *